(12) United States Patent
Umeda et al.

(10) Patent No.: US 8,893,383 B2
(45) Date of Patent: Nov. 25, 2014

(54) METHOD AND APPARATUS FOR COMPRESSING A MAT IN EXHAUST GAS CLEANING DEVICE

(75) Inventors: Yoshihiro Umeda, Hamamtsu (JP); Ryu Nakamura, Hamamatsu (JP)

(73) Assignee: Yutaka Giken Co., Ltd. (JP)

( * ) Notice: Subject to any disclaimer, the term of this patent is extended or adjusted under 35 U.S.C. 154(b) by 1118 days.

(21) Appl. No.: 12/451,754

(22) PCT Filed: May 30, 2008

(86) PCT No.: PCT/JP2008/060404
§ 371 (c)(1),
(2), (4) Date: Jan. 21, 2010

(87) PCT Pub. No.: WO2008/149960
PCT Pub. Date: Dec. 11, 2008

(65) Prior Publication Data
US 2010/0154215 A1   Jun. 24, 2010

(30) Foreign Application Priority Data

Jun. 1, 2007 (JP) ................................. 2007-147261
Jun. 1, 2007 (JP) ................................. 2007-147276

(51) Int. Cl.
*B21D 51/16* (2006.01)
*B23P 11/00* (2006.01)
*F01N 3/28* (2006.01)

(52) U.S. Cl.
CPC ........... *B23P 11/005* (2013.01); *F01N 2450/00* (2013.01); *F01N 3/2853* (2013.01); *B23P 2700/23* (2013.01)
USPC ........................................... 29/890; 425/111

(58) Field of Classification Search
CPC ............... B23P 11/005; B23P 2700/03; F01N 2450/00; F01N 3/2853
USPC .................................. 29/890, 890.08; 425/111
See application file for complete search history.

(56) References Cited

U.S. PATENT DOCUMENTS

| 5,329,698 | A  | * | 7/1994 | Abbott ............................ 29/890 |
| 6,505,396 | B1 | * | 1/2003 | Wieres ............................ 29/700 |
| 6,769,281 | B2 | * | 8/2004 | Irie et al. ........................ 72/121 |
| 6,912,784 | B2 | * | 7/2005 | Behner et al. .................... 29/890 |
| 7,174,634 | B2 | * | 2/2007 | Morikawa et al. ............... 29/890 |

(Continued)

FOREIGN PATENT DOCUMENTS

| JP | 2003074336 A | * | 3/2003 |
| JP | 2005282385   |   | 10/2005 |

(Continued)

*Primary Examiner* — Jacob Cigna
(74) *Attorney, Agent, or Firm* — Adams & Wilks (57) ABSTRACT

An apparatus compresses a mat against a cylindrical catalyst to provide an exhaust gas cleaning device having the catalyst and the mat wrapped around the catalyst. The apparatus has a base to which first and second rods are movably mounted, and first and second pressers connected to respective ones of the first and second rods. A first drive mechanism moves the first, but not the second, rods to bring the first pressers into contact with first peripheral surface portions of the mat so that second peripheral surface portions of the mat are formed into respective convex portions. A second drive mechanism moves the second rods to bring the second pressers into contact with the convex portions of the mat to compress the convex portions while the first pressers are maintained in pressure contact with the first peripheral surface portions of the mat.

19 Claims, 12 Drawing Sheets

(56) References Cited

U.S. PATENT DOCUMENTS

| | | | |
|---|---|---|---|
| 7,441,333 B2 * | 10/2008 | Sugiyama | 29/890 |
| 2003/0159286 A1 * | 8/2003 | Behner et al. | 29/890 |
| 2004/0052884 A1 * | 3/2004 | Schug et al. | 425/111 |
| 2004/0237305 A1 * | 12/2004 | Morikawa et al. | 29/896.62 |
| 2005/0142044 A1 * | 6/2005 | Sugiyama | 422/179 |
| 2007/0033804 A1 * | 2/2007 | Morikawa et al. | 29/890 |

FOREIGN PATENT DOCUMENTS

| | | | |
|---|---|---|---|
| JP | 2005282385 A | * | 10/2005 |
| JP | 2005315252 | | 11/2005 |
| WO | 2008046595 | | 4/2008 |

* cited by examiner

METHOD AND APPARATUS FOR COMPRESSING A MAT IN EXHAUST GAS CLEANING DEVICE

CROSS-REFERENCE TO RELATED APPLICATIONS

This application is a U.S. national stage application of International Application No. PCT/JP2008/060404 filed May 30, 2008, claiming an earliest priority date of Jun. 1, 2007, and published in a non-English language.

BACKGROUND OF THE INVENTION

1. Technical Field

The present invention relates to a technique for compressing a mat wrapped about a cylindrical catalyst.

2. Background Art

Engine exhaust gas contains carbon monoxide, hydrocarbons, nitrogen oxide, and other undesirable substances. In view of this fact, an exhaust gas cleaning device is currently mounted in the exhaust systems of vehicle engines and the like. An exhaust gas cleaning device acts to remove or detoxify undesirable substances. A method for manufacturing an exhaust gas cleaning device will be described with reference to the drawings.

Figure 11A:
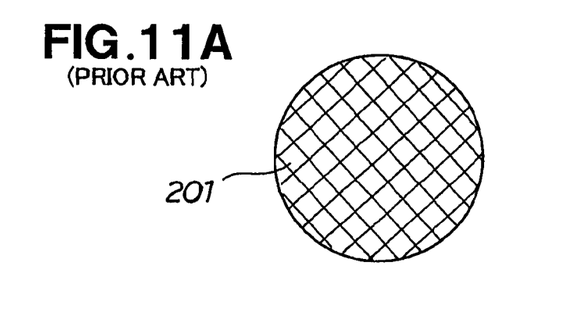
FIGS. 11A to 11D are schematic views showing a method for manufacturing a conventional exhaust gas cleaning device.
Figure 11B:
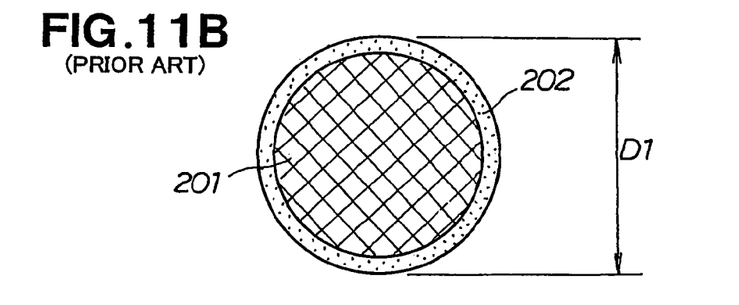

A catalyst 201 having a circular cross-section is prepared, as shown in FIG. 11A hereof. A mat 202 is wrapped about the catalyst 201, as shown in FIG. 11B. At this point, the outside diameter of the mat 202 is D1.

Figure 11C:
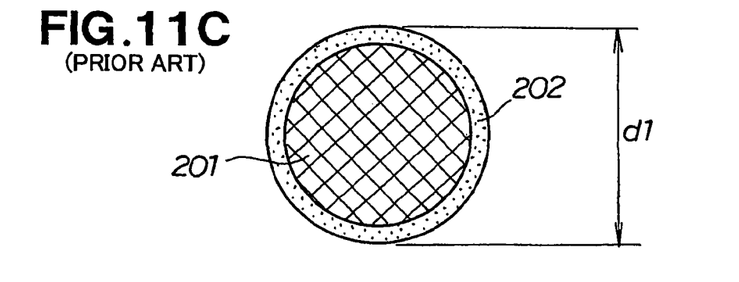
Figure 11D:
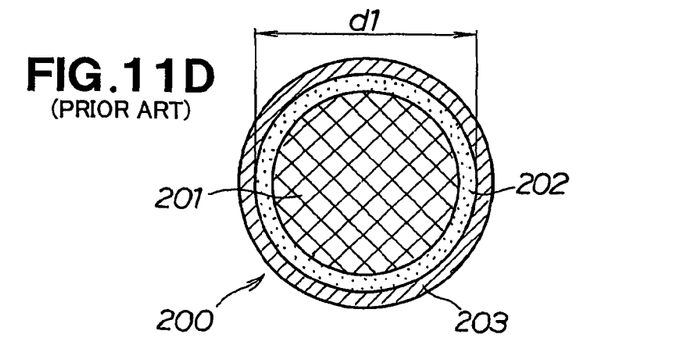

The mat 202 is then compressed until the outside diameter reaches d1, as shown in FIG. 11C and is inserted in a metal pipe 203 shown in FIG. 11D. An exhaust gas cleaning device 200 is obtained thereby. The outside diameter d1 is determined with consideration given to the inside diameter of the pipe 203.

In FIG. 11D, the compressed mat 202 attempts to return to the state prior to compression. As a result, the mat 202 presses the inside surface of the pipe 203 and the outside surface of the catalyst 201. Frictional force is generated between the pipe 203 and the mat 202 and between the catalyst 201 and the mat 202 due to the pressing force. Concern that the catalyst 201 will be separated from the pipe 203 is eliminated due to the effect of the frictional force.

In the description above, the work of compressing the mat 202 wrapped about the catalyst 201 is important, and several types of apparatuses have been proposed to provide that effect. One such apparatus is described in Japanese Patent Application Laid-Open Publication No. 2005-315252 (JP 2005-315252 A). The structure of the mat compression apparatus is described below with reference to FIG. 12.

Figure 12:
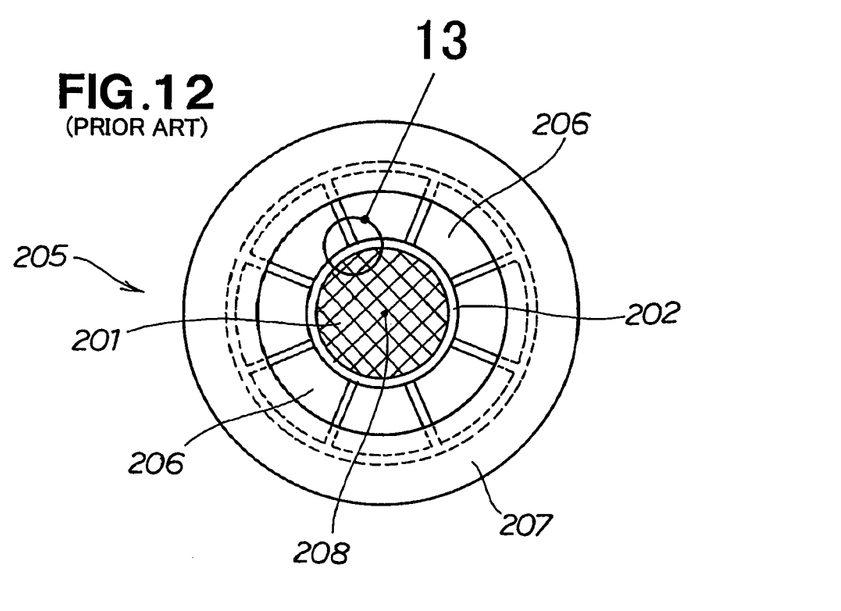
FIG. 12 is a schematic view showing a conventional mat compression apparatus.

The mat compression apparatus 205 is composed of pressers 206 obtained by dividing a thick cylinder into eight partitions, and an external cylinder 207 that moveably supports the pressers 206 toward the mat 202, as shown in FIG. 12. The mat 202 is then compressed by simultaneously causing the eight pressers 206 to move toward a center point 208 of the catalyst 201.

Figure 13:
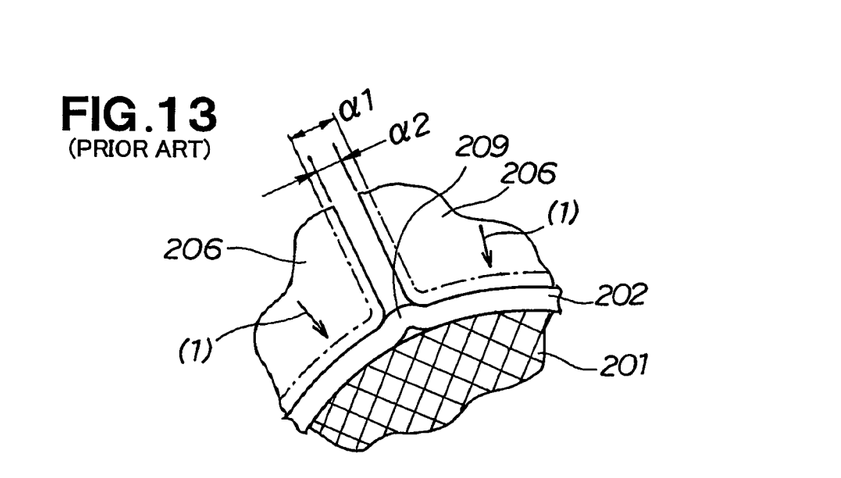
FIG. 13 is an enlarged view of section 13 of FIG. 12.

The pressers 206, 206 move toward the center point 208 in the manner shown by arrows (1), (1), as shown in FIG. 13, which is an enlarged view of section 13 of FIG. 12. For this reason, a gap $\alpha 1$ between the presser 206 and an adjoining presser 206 is considerable at the position shown by an imaginary line, and a gap $\alpha 2$ is reduced at the position shown by a solid line. The gaps $\alpha 1$ and $\alpha 2$ are always provided because the movement of the pressers 206, 206 toward the center point 208 becomes impossible when the gap reaches zero.

The gap varies from $\alpha 1$ to $\alpha 2$ when such compression is carried out. A portion of the mat 202 at a position corresponding to the large gap $\alpha 1$ is drawn in by the pressers 206, 206. The portion of the mat 202 is sandwiched between the pressers 206, 206 and forms a convex section 209. The convex section 209 interferes with the cylindrical unit 203 in the process from FIGS. 11C to 11D.

In view of the above, a step for crushing and flattening the convex section 209 is required after the compression step. The labor involved in mat compression is increased when the steps for flattening become more numerous.

In view of the above, a mat compression technique is needed in which there is no concern that a convex section will be formed in the mat.

SUMMARY OF THE INVENTION

According to a first aspect of the present invention, there is provided a method for compressing a mat of an exhaust gas cleaning device having a catalyst, which comprises the steps of providing the exhaust gas cleaning device with the mat wrapped around the catalyst; orienting pressers obtained by dividing a cylinder into an even number of pieces of four or more such that the pieces face an external periphery of the mat; primarily compressing the mat by causing only odd-numbered ones of the pressers to move forward; and secondarily compressing the mat by causing even-numbered ones of the pressers to move forward while a compressed state is maintained by the odd-numbered pressers.

First, only the odd-numbered pressers are caused to move forward to compress the mat. At this point, a portion of the mat becomes convex between the pressers. The even-numbered pressers are then caused to move forward. The even-numbered pressers act to compress the convexities. As a result, a mat compression technique can be provided in which there is no concern that a convex portion will occur in the mat.

Preferably, the exhaust gas cleaning device provision step comprises the steps of disposing the mat on the catalyst such that a central upper surface of the mat makes contact with the catalyst; disposing a left guide rod on a lower surface of the mat positioned to a left side of a center of the mat, and disposing a right guide rod on the lower surface of the mat positioned to a right side of the mat center; wrapping the mat around the catalyst by guiding the left guide rod such that a left side portion of the mat makes contact with an external peripheral surface of a left half of the catalyst, and guiding the right guide rod such that a right side portion of the mat makes contact with the external peripheral surface of a right half of the catalyst; and pressing end portions of the wrapped mat.

In the present invention, the mat is wrapped around the catalyst with the aid of the left and right guide rods. The wrapping can be performed without difficulty even if the outside diameter of the catalyst varies. There is no concern that the mat will become wedged in the guide rods due to being wrapped by the guide rods. Consequently, a mat wrapping technique can be provided that can respond to changes in the outside diameter of the catalyst and in which there is no concern that the mat will become wedged.

According to a second aspect of the present invention, there is provided an apparatus for compressing a mat against a cylindrical catalyst to provide an exhaust gas cleaning device having the catalyst and the mat wrapped around the latter, which apparatus comprises: pressers obtained by dividing a cylinder into an even number of pieces of four or more and disposed on a periphery of the mat; presser support parts for movably supporting the pressers towards the mat; a primary drive mechanism for causing only odd-numbered ones of the pressers to move forward; a secondary drive mechanism for causing only even-numbered ones of the pressers to move forward; and a controller for causing the secondary drive mechanism to operate after the primary drive mechanism is caused to operate.

First, only the odd-numbered pressers are caused to move forward to compress the mat. At this point, a portion of the mat forms a convexity between the pressers. The even-numbered pressers are then caused to move forward. The even-numbered pressers act to compress the convexity. As a result, a mat compression technique can be provided in which there is no concern that a convex portion will occur in the mat.

Furthermore, apparatus manufacturing costs can be reduced because the mat compression apparatus has a simple configuration whose main elements include a plurality of pressers, a primary drive mechanism for causing only the odd-numbered pressers to move forward, and a secondary drive mechanism for causing only the even-numbered pressers to move forward.

A first presser for pressing end portions of the mat may be included in the odd-numbered pressers. In this manner, the end portions of the mat are initially pressed, whereby the end portions of the mat can be prevented from springing upward and being damaged.

In a preferred form, two ends of the even-numbered pressers are divided in parallel to respective movement axes. Consequently, the gap between adjoining pressers can be kept constant. There is no concern that the mat will become wedged by the adjoining pressers because the gap does not vary.

DETAILED DESCRIPTION OF THE INVENTION

Figure 1:
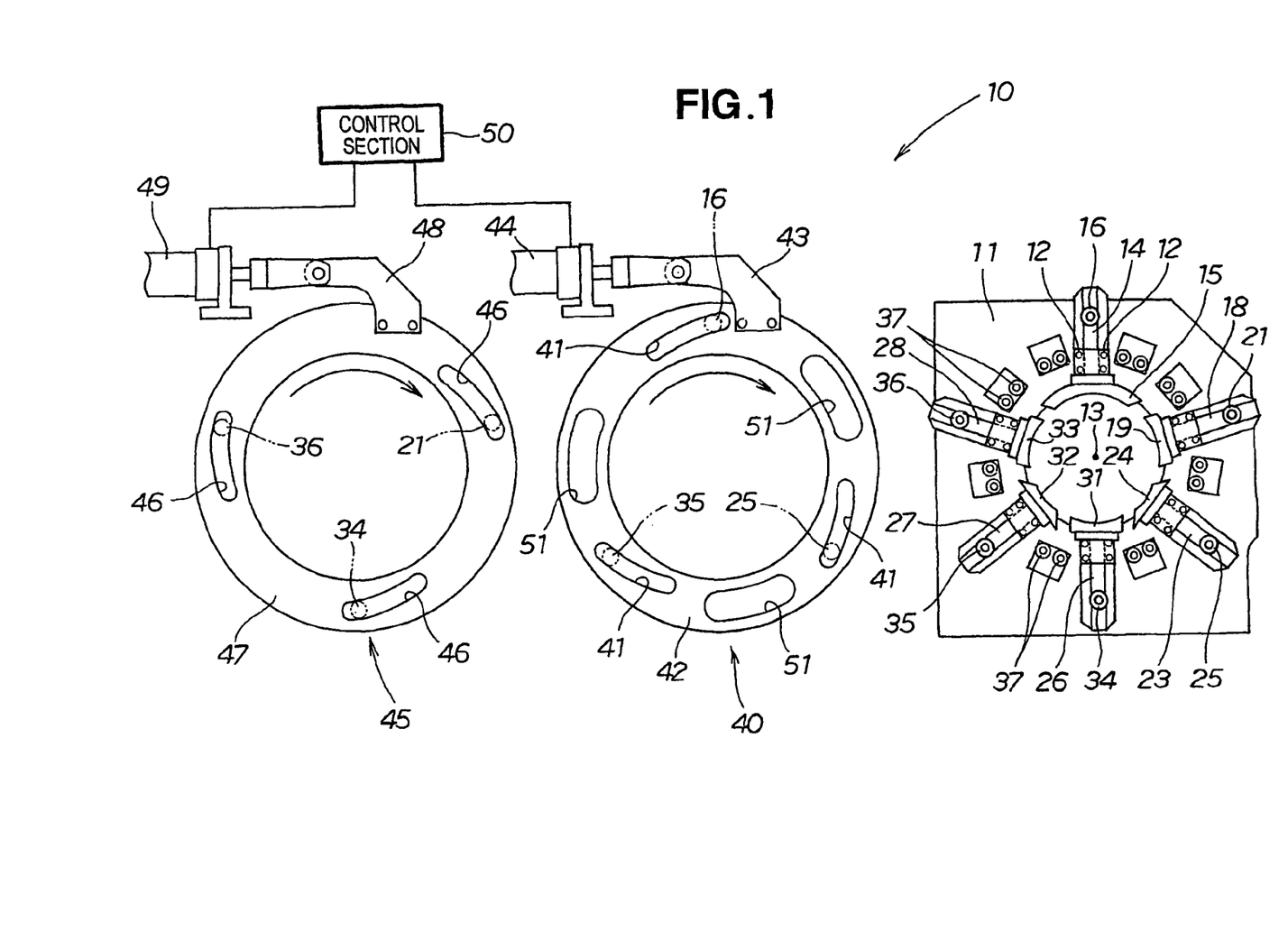
FIG. 1 is an exploded view of a mat compression apparatus according to the present invention.

A mat compression apparatus 10 has a base 11, a first drive mechanism 40, and a second drive mechanism 45, as shown in FIG. 1.

The base 11 has a first rod 14 supported so as to be able to move toward a center point 13 by guides 12, 12 as supports for pressers, a first presser 15 disposed at a distal end of the first rod 14, and a first roller 16 disposed at a base part of the rod 14.

Furthermore, the base 11 has a second rod 18 supported so as to be able to move toward the center point 13 by the guides 12, 12; a second presser 19 disposed at a distal end of the second rod 18; and a second roller 21 disposed at a base part of the second rod 18. Furthermore, the base 11 has a third rod 23 supported so as to be able to move toward the center point 13 by the guides 12, 12; a third presser 24 disposed at a distal end of the third rod 23; and a third roller 25 disposed at a base part of the second rod 23.

In a similar manner, 26, 27, and 28 designate a fourth rod, a fifth rod, and a sixth rod. Reference numerals 31, 32, and 33 designate a fourth presser, a fifth presser, and a sixth presser. Reference numerals 34, 35, and 36 designate a fourth roller, a fifth roller, and a sixth roller. Also, 37 is a ring support roller for supporting ring plates 42 and 47.

The first drive mechanism 40 is composed of the first ring plate 42 having three cam grooves 41 that mesh with the first roller 16, the third roller 25, and the fifth roller 35; a bracket 43 extending from the first ring plate 42; and a first actuator 44 connected to the bracket 43.

The second drive mechanism 45 is composed of the second ring plate 47 having three cam grooves 46 that mesh with the second roller 21, the fourth roller 34, and the sixth roller 36; a bracket 48 extending from the second ring plate 47; and a second actuator 49 connected to the bracket 48.

The first actuator 44 and the second actuator 49 are controlled by a controller 50. The controller 50 first moves the first actuator 44 forward and rotates the first ring plate 42 clockwise in the diagram. The ring plate 42 is maintained in that state. Control is subsequently performed in which the second actuator 49 is moved forward and the second ring plate 47 is rotated clockwise in the drawing.

There is no concern that the second roller 21, the fourth roller 34, and the sixth roller 36 will interfere with the first ring plate 42 because the rollers+ pass via a large through-hole 51 disposed in the first ring plate 42.

The first drive mechanism 40 is overlaid on the base 11, and the second drive mechanism 45 is subsequently overlaid. The mat compression apparatus 10 shown in FIG. 2 is thereby completed.

Figure 2:
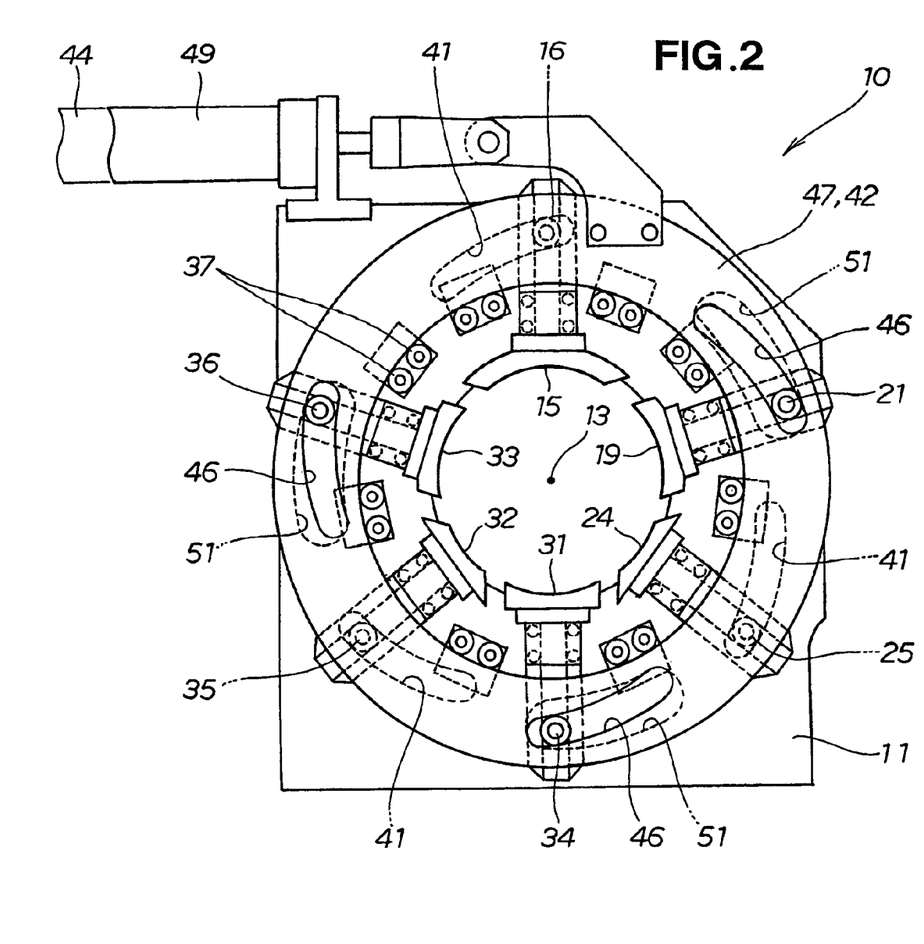
FIG. 2 is a front elevational view of the mat compression apparatus of FIG. 1.

The second presser 19, the fourth presser 31, and the sixth presser 33 can be collectively oriented to face the center point 13 when the second ring plate 47 is rotated by the second actuator 49 in the clockwise direction in the drawing, as shown in FIG. 2. The first presser 15, the third presser 24, and the fifth presser 32 can be collectively oriented to face the center point 13 when the first ring plate 42 is rotated by the first actuator 44 in the clockwise direction in the drawing.

The effect of the mat compression apparatus 10 having the configuration described above will be described next.

Figure 3A:
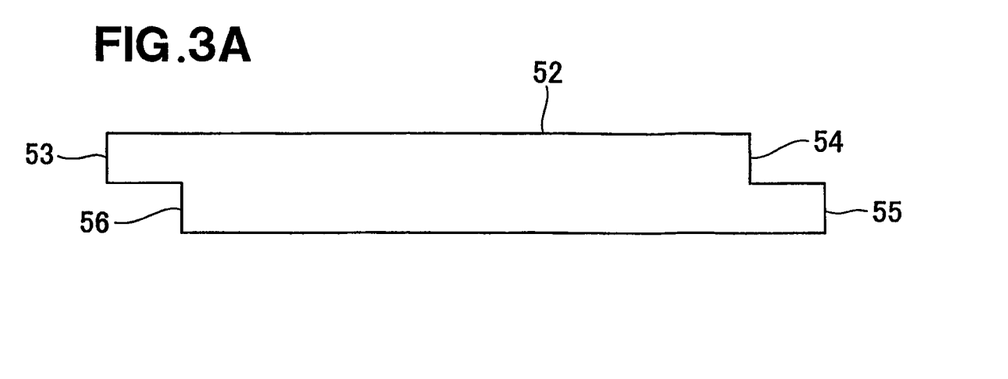
FIGS. 3A to 3C are schematic views showing a mat wrapping step.

A belt-shaped mat 52 is prepared as shown in FIG. 3A. The mat 52 has end portions 53 and 55 that are notched in an amount equal to half the width. In other words, the end part 53 having half the width has a shape that can be matched with a notch 54, and the end part 55 having half the width has a shape that can be matched with a notch 56.

Figure 3B:
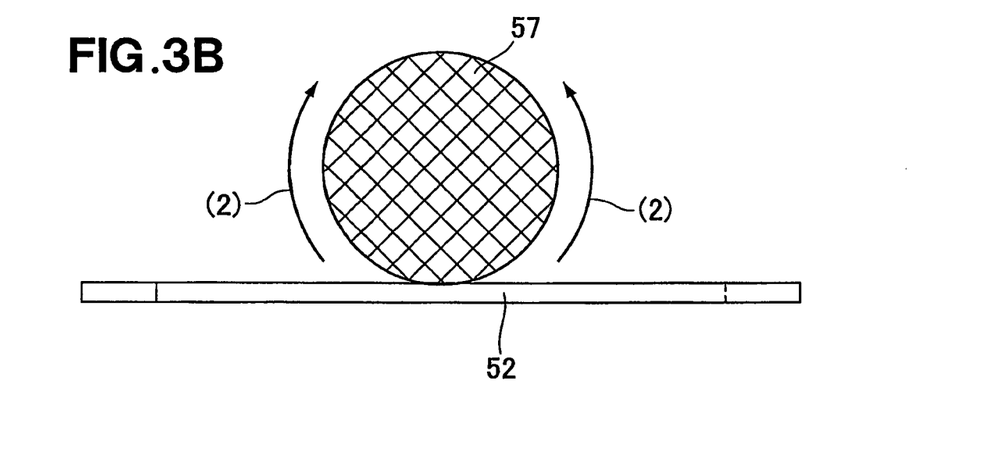
Figure 3C:
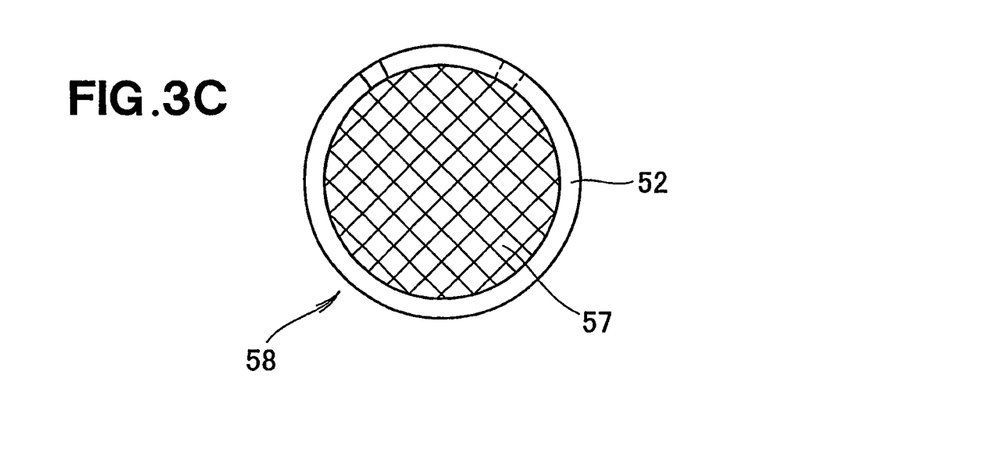

Such a mat 52 is brought into contact with a cylindrical catalyst 57, as shown in FIG. 3B. A mat roll 58 shown in FIG. 3C is subsequently obtained by wrapping the mat as shown by arrows (2), (2).

Figure 4A:
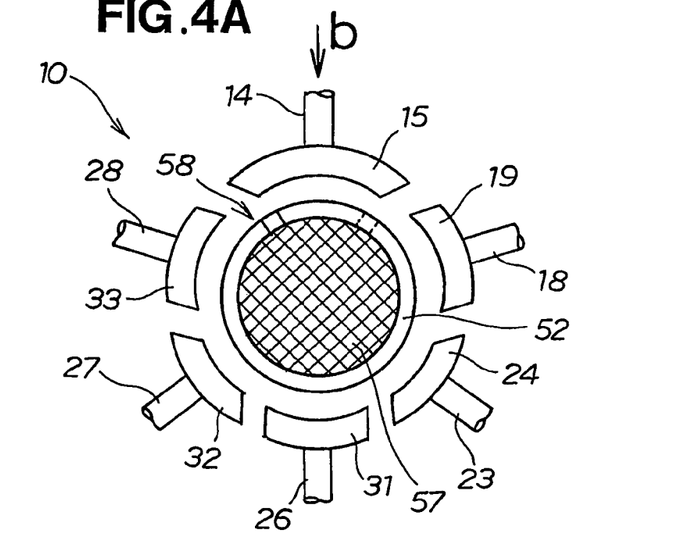
FIGS. 4A to 4C are schematic views showing the process from a step for orienting the mat such that the mat faces pressers all the way to a primary compression step.

Next, the mat roll 58 is set in the mat compression apparatus 10, as shown in FIG. 4A. As a result, the pressers 15, 19, 24, 31, 32, 33 obtained by dividing the circumference into an even number of four or more sections (six in this example) can be made to face an external periphery of the mat 52.

Figure 4B:
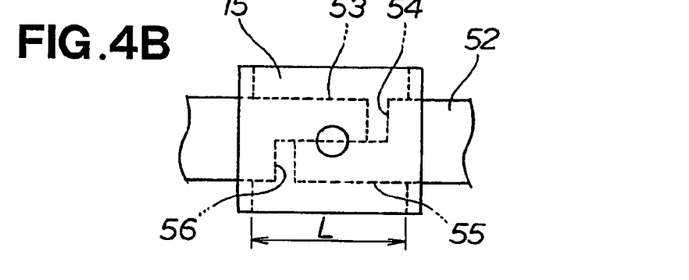

The first presser 15 has an arcuate length L which covers all the end portions 53, 55 and the notches 54, 56 of the mat 52, as shown in FIG. 4B, which is a view as seen from arrow b of FIG. 4A. For this reason, the first presser 15 has an arcuate length that is set to be greater than the pressers from the second presser 19 to the sixth presser 33, as shown in FIG. 4A.

Figure 4C:
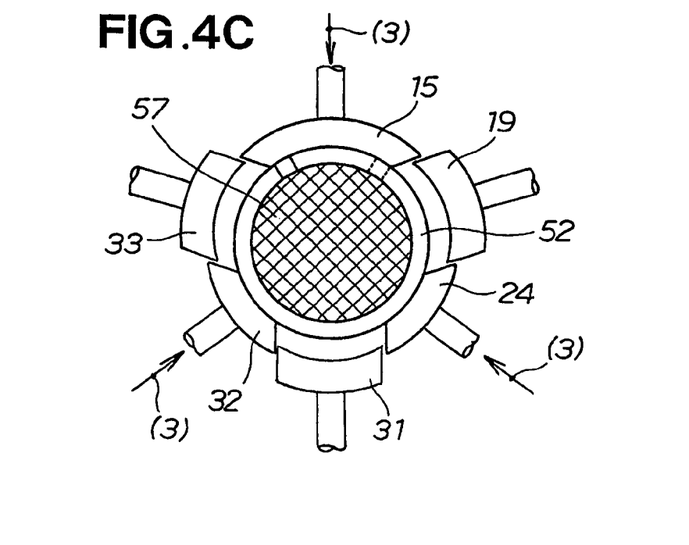

The first presser 15, the third presser 24, and the fifth presser 32 are subsequently moved in the manner of arrows (3), (3), (3), and the mat 52 is compressed as shown in FIG. 4C. This compression step is the primary compression step.

Figure 5A:
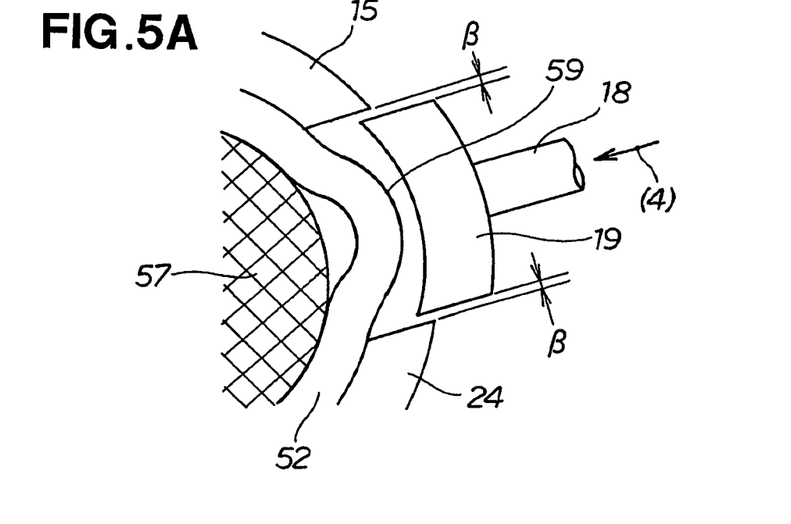
FIGS. 5A and 5B are schematic views illustrating a secondary compression step.

When the primary compression step has ended, a part of the mat 52 bulges considerably between the first presser 15 and the third presser 24, and a convex section 59 is formed, as shown in FIG. 5A. The second presser 19 is then moved along a movement axis (4). The convex section 59 is compressed by the second presser 19.

Figure 5B:
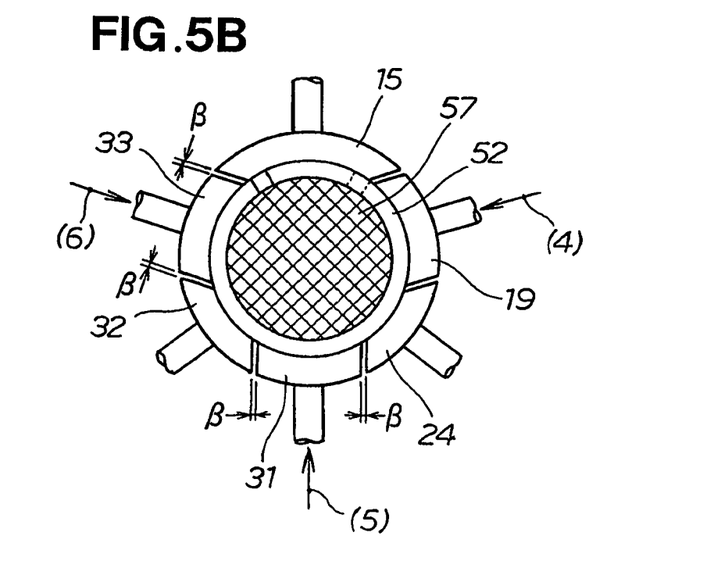

In other words, while the odd-numbered pressers 15, 24, 32 are maintained in a compressed state, the even-numbered pressers 19, 31, 33 are moved forward along movement axes (4), (5), (6), and the mat 52 is compressed, as shown in FIG. 5B. This compression step is the secondary compression step.

As stated above, only the odd-numbered pressers 15, 24, 32 are initially moved forward, and the mat 52 is compressed. At this point, a part of the mat 52 forms a convexity (the convex section 59) between the pressers. The even-numbered pressers 19, 31, 33 are then moved forward. The even-numbered pressers 19, 31, 33 act to press and crush the convexity (the convex portion 59).

As a result, a mat compression technique can be provided in which there is no concern that the convex portion 59 will remain in the mat 52.

Additionally, the first presser 15 that presses the end portions 53, 55 of the mat 52 is included in the odd-numbered pressers 15, 24, 32, as shown in FIGS. 4A and 4B.

It is assumed that moving the even-numbered pressers 19, 31, 33 forward in the primary compression step causes the end portions 53, 55 of the mat 52 to spring up when compressed by the second presser 19 and the sixth presser 33. If the first presser 15 is subsequently moved forward despite the noticeable upward spring, the end portions 53, 55 bend or the like, the end portions 53, 55 are liable to incur damage.

In view of this point, in accordance with the present invention, the upward spring of the end portions 53, 55 of the mat 52 can be prevented by initially pressing the end portions 53, 55 of the mat 52, and damage to the end portions 53, 55 of the mat 52 can be prevented.

Furthermore, the two ends of the second presser 19 are divided in parallel to the advancing direction indicated by the movement axis (4), as shown in FIG. 5A. The lower end of the upper adjacent first presser 15 maintains a gap β and is divided in parallel to the advancing direction indicated by the movement axis (4). The upper end of the lower portion of the third presser 24 maintains a gap β and is divided in parallel to the advancing direction indicated by the movement axis (4).

According to this structure, the size of the gaps β, β does not change even if the presser 19 is moved along the movement axis (4).

As described in the prior art, reducing the gap as the presser moves forward causes a part of the mat to be drawn in and sandwiched.

In view of this point, in accordance with the present invention, there is no concern of damaging the mat 52 because the size of the gaps β, β does not vary.

In a similar manner, in FIG. 5B, the two ends (left and right ends) of the fourth presser 31 are divided in parallel to the movement axis (5). The left end of the right adjacent third presser 24 also maintains a gap β and is divided in parallel to the movement axis (5). The right end of the left adjacent fifth presser 32 also maintains a gap β and is divided in parallel to the movement axis (5).

The two ends (upper and lower ends) of the sixth presser 33 are divided in parallel to the movement axis (6). The upper end of the lower adjacent fifth presser 32 maintains a gap β and is divided in parallel to the movement axis (6). The lower end of the upper adjacent first presser 15 maintains a gap β and is divided in parallel to the movement axis (6).

In other words, the present invention is characterized in that the two ends of the even-numbered pressers are divided in parallel to their respective movement axes, and the end portions of the even-numbered pressers are divided in parallel to the adjoining pressers. As a result, the gap between the adjoining pressers is constant. There is no concern that the mat will be become wedged by the adjoining pressers because the gap does not vary.

Next, another embodiment of the present invention will be described with reference to FIG. 6. The same reference numerals of FIG. 2 will be used for the shared elements, and a detailed description will be omitted.

Figure 6:
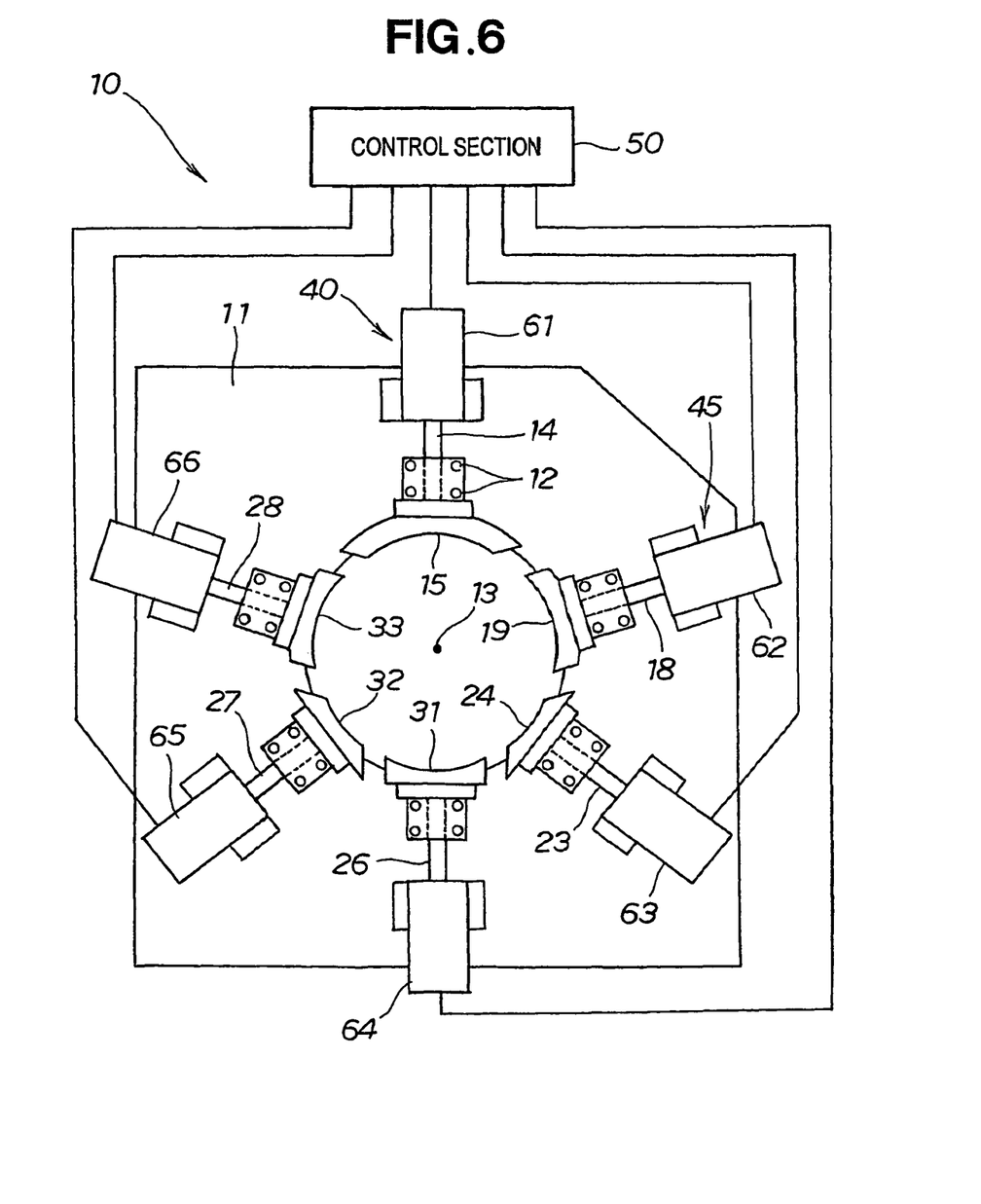
FIG. 6 is a schematic view showing another embodiment of the apparatus of FIG. 2.

The first drive mechanism 40 is composed of a first actuator 61 connected to a first rod 14, a third actuator 63 connected to a third rod 23, and a fifth actuator 65 connected to a fifth rod 27, as shown in FIG. 6.

The second drive mechanism 45 is composed of a second actuator 62 connected to a second rod 18, a fourth actuator 64 connected to a fourth rod 26, and a sixth actuator 66 connected to a sixth rod 28.

The first drive mechanism 40 is first operated by a controller 50, whereby the first presser 15, the third presser 24, and the fifth presser 32 are moved forward.

Next, the second drive mechanism 45 is operated, whereby the second presser 19, the fourth presser 31, and the sixth presser 33 are moved forward.

The configuration of the first drive mechanism 40 and the second drive mechanism 45 is thus made arbitrary. In other words, the structure may be one in which the first presser 15, the third presser 24, and the fifth presser 32 are first moved forward; and the second presser 19, the fourth presser 31, and the sixth presser 33 are subsequently moved forward.

The number of pressers in the embodiment was six, but four, eight, or ten pressers are also possible, and an even number of four or more pieces is also possible.

Also, although the first presser was shaped differently from the other pressers, the other pressers may be the same shape depending on the shape of the ends of the mat.

In the description above, the work of mounting the mat 52 shown in FIGS. 3A to 3C can be carried out using a mat mounting apparatus in addition to being performed manually by a worker. The mat mounting apparatus will be described with reference to FIG. 7.

Figure 7:
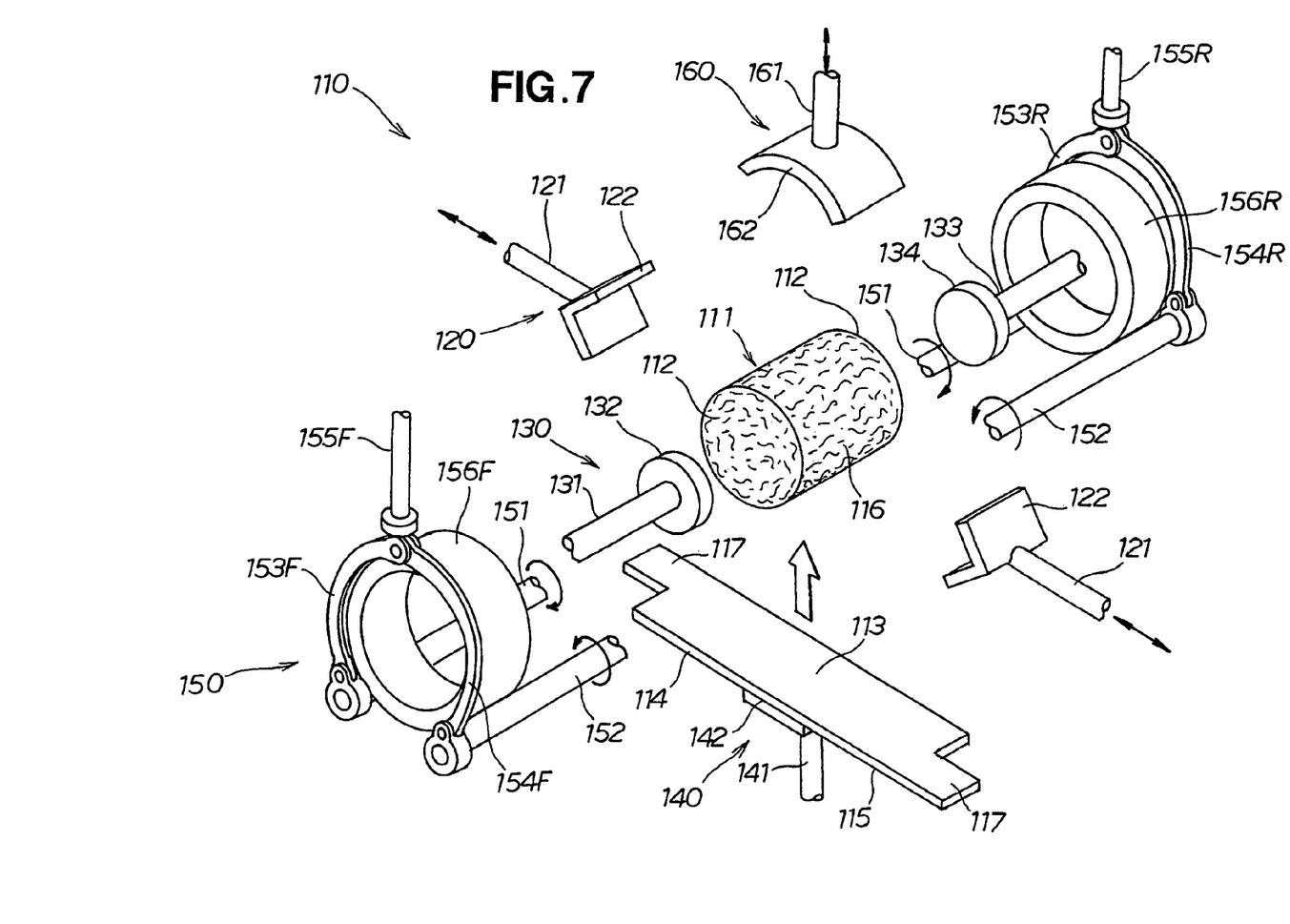
FIG. 7 is an exploded perspective view showing a basic configuration of a mat mounting apparatus.

As shown in FIG. 7, a mat mounting apparatus 110 is composed of a catalyst positioning mechanism 120 for positioning a catalyst 111 by sandwiching the catalyst 111 (this is the same object as the one designated by reference numeral 57 of FIG. 3B, but a different reference numeral is used in this case for the sake of convenience), a catalyst supporting mechanism 130 for supporting the catalyst 111 by sandwiching end surfaces 112, 112 of the catalyst 111 positioned by the catalyst positioning mechanism 120, a mat movement mechanism 140 for orienting a mat 113 (this is the same object as the one designated by reference numeral 52 of FIG. 3A, but a different reference numeral is used for the sake of convenience) so that the mat faces the catalyst 111 supported by the catalyst supporting mechanism 130, a left guide rod 151 placed in contact with the left-side lower surface 14 of the mat 113 placed in a prescribed position by the mat movement mechanism 140, a right guide rod 152 placed in contact with the right-side lower surface 115 of the mat 113 disposed in a prescribed position by the mat movement mechanism 140, a guide rod drive mechanism 150 in which the left and right guide rods 151, 152 provide guidance so that the mat 133 runs along the external peripheral surface 116 of the catalyst 111 and wrap the mat 133 around the catalyst 111, and a mat end-portion pressing mechanism 160 for pressing end portions 117, 117 of the wrapped mat 113.

A preferred structure of the mechanisms 120 to 160 is described next. The operation of the mechanisms 120 to 160 is described in FIGS. 8A to 9D.

The catalyst positioning mechanism 120 is composed of moving rods 121, 121 that move in a direction orthogonal to the axis of the catalyst 111 and V-shaped plates 122,122 that are secured to the distal ends of the moving rods 121, 121.

The catalyst supporting mechanism 130 is composed of a front moving rod 131 that moves in the axial direction of the catalyst 111, a front disc 132 disposed at the distal end of the front moving rod 131, a rear moving rod 133 that is coaxially disposed and moves horizontal to the moving rod 131, and a rear disc 134 disposed at the distal end of the rear moving rod 133.

The mat movement mechanism 140 is composed of a moving rod 141 that moves in the manner of the arrow in a direction that is orthogonal to the axis of the catalyst 111, and a backing plate 142 disposed at the upper end of the movement axis 141.

The guide rod drive mechanism 150 is a drive mechanism for moving the left and right guide rods 151, 152, as shown in FIG. 7, and is composed of left arms 153F, 153R that rotatably support the two ends of the left guide rod 151, right arms 154F, 154R that rotatably support the two ends of the right guide rod 152, an elevating rod 155F for causing the left and right arms 153F, 154F to rise up together, an elevating rod 155R for causing the left and right arms 153R, 154R to rise up together, and cylindrical cam cylinders 156F, 156R for guiding the base part of the left and right guide rods 151, 152 disposed at the two ends of the catalyst 111.

The mat end-portion pressing mechanism 160 is composed of a moving rod 161 that is moved orthogonal to the vertical direction in relation to the axis of the catalyst 111, and a curved plate 162 disposed at the lower end of the moving rod 161.

The effect of the mat mounting apparatus 10 having the configuration described above will be described next.

Figure 8A:
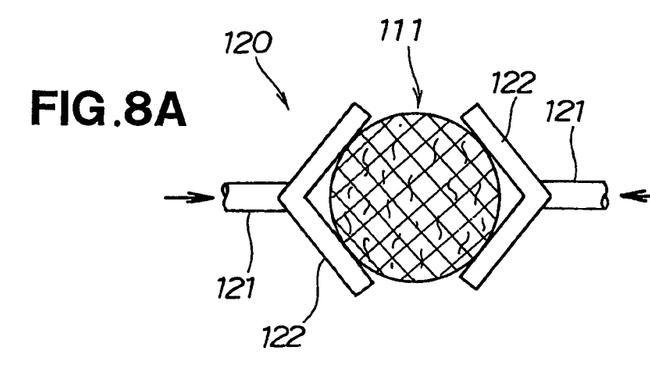
FIGS. 8A to 8C are schematic views illustrating a step for providing the mat.

The catalyst 111 is positioned laterally and vertically in the drawing by being sandwiched between the V-shaped plates 122, 122 of the catalyst positioning mechanism 120, as shown in FIG. 8A.

Figure 8B:
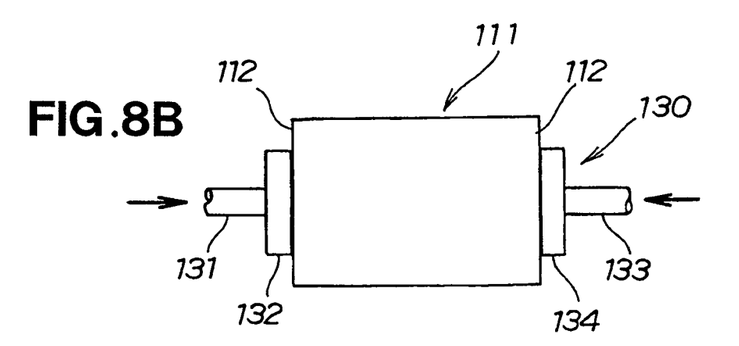

The end pieces 112, 112 of the catalyst 111 are subsequently sandwiched by the front disc 132 and the rear disc 134 using the catalyst supporting mechanism 130, as shown in FIG. 8B. The positioning of the catalyst 111 in the axial lengthwise direction is thereby determined. The catalyst 111 is thereafter continuously supported by the front disc 132 and the rear disc 134 until all the steps have been completed. The V-shaped plates 122, 122 are no longer in use, and are therefore returned to a standby position.

Figure 8C:
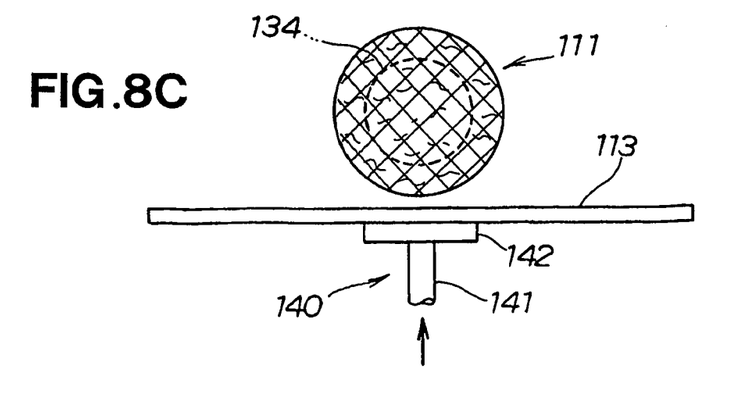

The mat 113 is then placed by the mat movement mechanism 140 below the catalyst 111, as shown in FIG. 8C. The mat 113 is disposed so that the center of the mat 113 (center in the lengthwise direction; and center of the lateral direction in the drawing) matches the center of the catalyst 111.

Figure 9A:
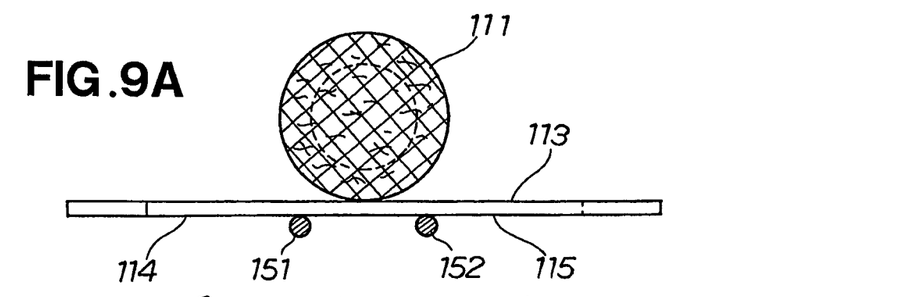
FIGS. 9A to 9D are schematic views showing the process from a step for orienting the mat such that the mat faces a catalyst all the way to a step for pressing of an end of the mat.

The center upper surface of the mat 113 makes contact with the catalyst 111, as shown in FIG. 9A. The left guide rod 151 is then disposed on the left-side lower surface 114 from the center of the mat 113, and the right guide rod 152 is disposed on the right-side lower surface 115 from the center of the mat 113.

Figure 9B:
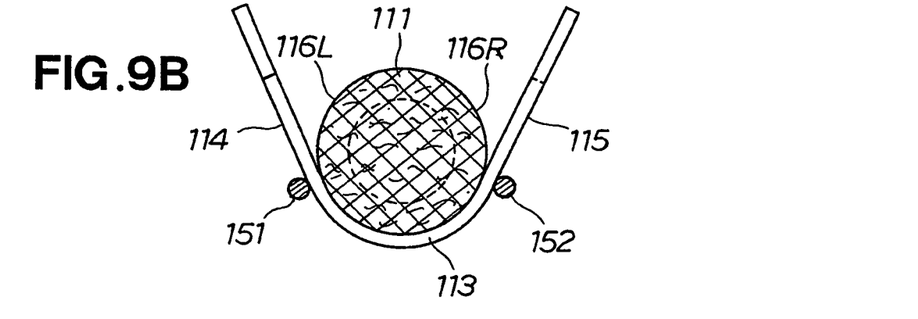
Figure 9C:
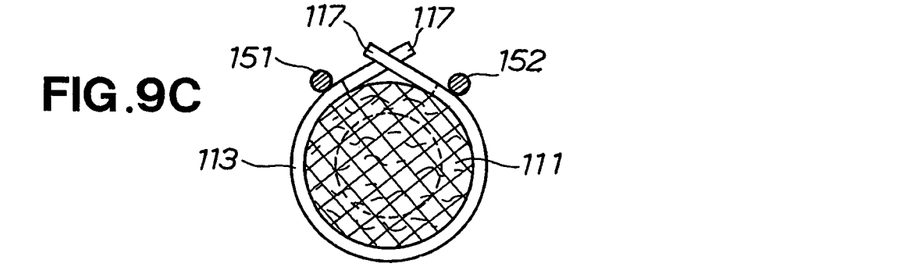

Next, the left guide rod 151 is moved following the left peripheral surface 116L of catalyst 111, and the right guide rod 152 is moved following the right peripheral surface 116R of the catalyst 111, as shown in FIG. 9B. At this point, the mat 113 can be wrapped around the catalyst 111, as shown in FIG. 9C.

Figure 9D:
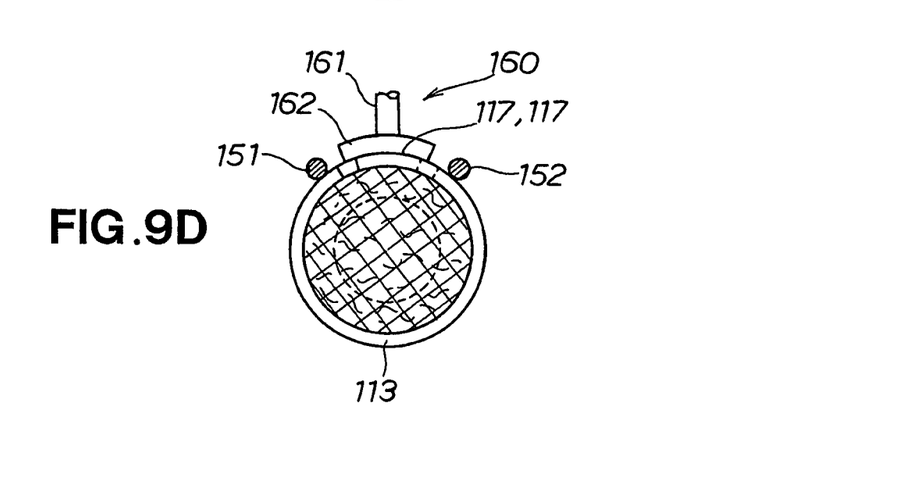

The end portions 117, 117 of the mat 113 are subsequently pressed by the mat end-portion pressing mechanism 160, as shown in FIG. 9D. The mounting of the mat 113 is thereby completed.

The mat is wrapped around the catalyst using the left and right guide rods in the method described above. The wrap can be implemented without difficulty even if the outside diameter of the catalyst varies. There is no concern that the mat will become wedged in the guide rods due to being wrapped by the guide rods. Consequently, a mat wrapping technique can be provided that can be adapted to changes in the outside diameter of the catalyst and in which there is no concern that the mat will be wedged.

Figure 10A:
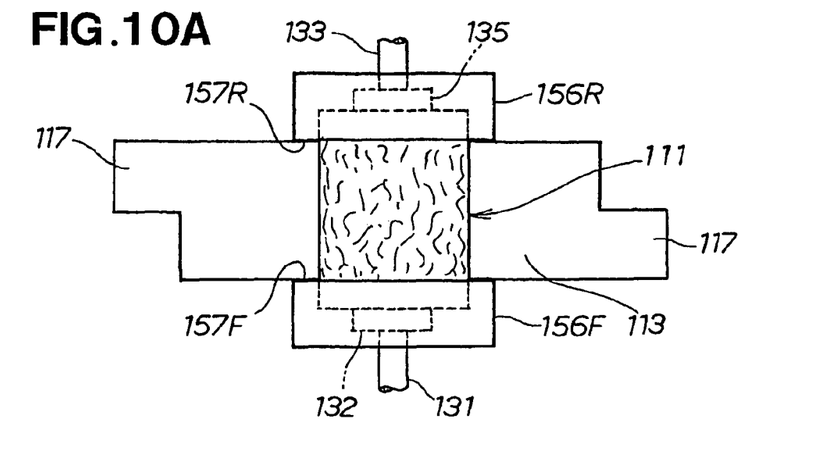
FIGS. 10A to 10C are schematic views showing a relationship between a cam cylinder and a guide rod.
Figure 10B:
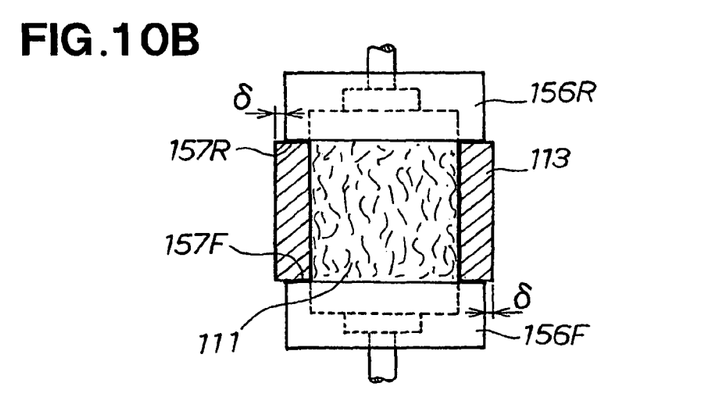
Figure 10C:
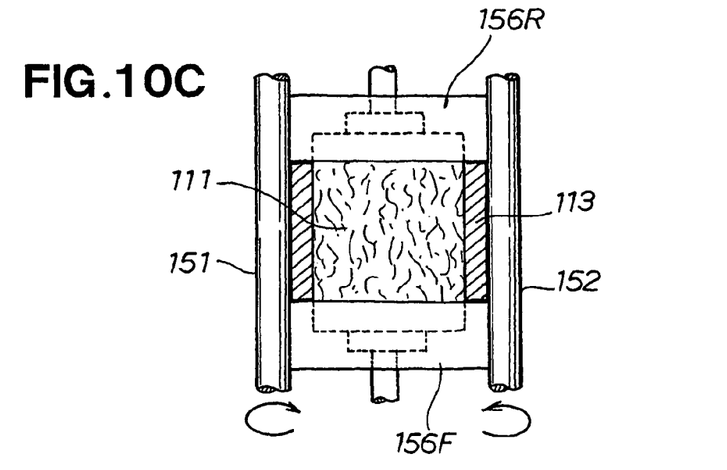

The relation between the guide rods 151, 152 and the cam cylinders 156F, 156R will be described next. FIGS. 10A to 10C are schematic views of the catalyst 111 as viewed from above.

The cam cylinders 156F, 156R cover a portion of the catalyst 111, as shown in FIG. 10A. For this reason, the space between the interior end surface 157F of the cam cylinder 156F and the interior end surface 157R of the cam cylinder 156R is less than the length of the catalyst 111. The space is set to a length that corresponds to the width of the mat 113. Accordingly, the mat 113 does not become displaced in the vertical direction in the diagram and is attached to the catalyst 111.

Next, a portion of the mat 113 protrudes from the cam cylinders 156F, 156R in an amount equal to δ, δ when the mat 113 is wrapped around the catalyst 111, as shown in FIG. 10B. In other words, the outside diameters of the cam cylinders 156F, 156R are set so that a portion of the mat 113 protrudes from the cam cylinders 156F, 156R in an amount equal to δ, δ.

As shown in FIG. 10C, δ, δ are compressed by the guiding left and right guide rods 151, 52 that are guided along the external peripheral surface of the guide cylinders 156F, 156R. The operations shown in FIGS. 9B and 9C are carried out while the mat 113 is extended in the depth direction of the drawing because the operations shown in FIGS. 10B and 10C proceed simultaneously. As a result, there is no concern that slack will remain in the mat 113.

INDUSTRIAL APPLICABILITY

The present invention is advantageously used as a technique for compressing a mat housed in an exhaust gas cleaning device provided to an engine exhaust pipe.

The invention claimed is:
1. A method for compressing a mat of an exhaust gas cleaning device having a catalyst, comprising the steps of:
providing the exhaust gas cleaning device with the mat wrapped around the catalyst;

providing a plurality of pressers obtained by dividing a cylinder into an even number of four or more pieces to provide a set of odd-numbered pressers and a set of even-numbered pressers, the plurality of pressers being integrally connected to respective ones of a plurality of rods movably mounted to a base;

positioning the exhaust gas cleaning device relative to the base so that each of the plurality of pressers is disposed in spaced-apart, confronting relation relative to an external periphery of the mat;

while each of the plurality of pressers is disposed in spaced-apart, confronting relation relative to the external periphery of the mat, performing a primary compression step of compressing the mat by moving only the rods corresponding to the set of odd-numbered pressers relative to the base to cause only the set of odd-numbered pressers to move forward into contact with the external periphery of the mat; and performing a secondary compression step of compressing the mat by moving the rods corresponding to the set of even-numbered pressers relative to the base to cause the set of even-numbered pressers to move forward into contact with the external periphery of the mat while a compressed state is maintained by the set of odd-numbered pressers.

2. A mat compressing method according to claim 1; wherein the exhaust gas cleaning device provision step comprises the steps of:

disposing the mat on the catalyst such that a central upper surface of the mat makes contact with the catalyst;

disposing a left guide rod on a lower surface of the mat positioned to a left side of a center of the mat, and disposing a right guide rod on the lower surface of the mat positioned to a right side of the mat center;

wrapping the mat around the catalyst by guiding the left guide rod such that a left side portion of the mat makes contact with an external peripheral surface of a left half of the catalyst, and guiding the right guide rod such that a right side portion of the mat makes contact with the external peripheral surface of a right half of the catalyst; and pressing end portions of the wrapped mat.

3. A method for compressing a mat of an exhaust gas cleaning device having a catalyst, comprising the steps of:

providing the exhaust gas cleaning device with the mat wrapped around the catalyst;

orienting each of a first set of pressers and a second set of pressers so as to confront an external periphery of the mat in spaced-apart relation thereto, each presser of the first and second sets of pressers being integrally connected to respective ones of a plurality of rods movably mounted to a base;

while each presser of the first and second sets of pressers is disposed in spaced-apart, confronting relation relative to the external periphery of the mat, performing a first compression step of compressing the mat by moving the rods corresponding to the first set of pressers, but not the rods corresponding to the second set of pressers, to bring the first set of pressers into contact with the external periphery of the mat to form convex portions of the mat between the pressers of the first set of pressers; and performing a second compression step of compressing the mat by moving rods corresponding to the second set of pressers to bring the second set of pressers into contact with the respective convex portions to press the convex portions while a compressed state is maintained by the first set of pressers.

4. A method according to claim 3; wherein the first and second set of pressers are oriented so as to confront an external periphery of the mat with the pressers of the first set of pressers being alternately arranged with the pressers of the second set of pressers.

5. A method according to claim 3; wherein the exhaust gas cleaning device provision step comprises the steps of:

disposing the mat on the catalyst such that a central upper surface of the mat makes contact with the catalyst;

disposing a left guide rod on a lower surface of the mat positioned to a left side of a center of the mat, and disposing a right guide rod on the lower surface of the mat positioned to a right side of the mat center;

wrapping the mat around the catalyst by guiding the left guide rod such that a left side portion of the mat makes contact with an external peripheral surface of a left half of the catalyst, and guiding the right guide rod such that a right side portion of the mat makes contact with the external peripheral surface of a right half of the catalyst; and pressing end portions of the wrapped mat.

6. An apparatus for compressing a mat against a cylindrical catalyst to provide an exhaust gas cleaning device having the catalyst and the mat wrapped around the catalyst, comprising:

a plurality of pressers formed of a cylinder divided into an even number of four or more pieces providing a set of odd-numbered pressers and a set of even-numbered pressers disposed on a periphery of the mat, the plurality of pressers being integrally connected to respective ones of a plurality of rods movably mounted to a base;

a plurality of presser support parts for movably supporting respective ones of the rods relative to the base;

first drive means for moving only the rods corresponding to the set of odd-numbered pressers relative to the base to cause only the set of odd-numbered pressers to move forward into contact with the periphery of the mat to compress the mat;

second drive means for moving only the rods corresponding to the set of even-numbered pressers relative to the base to cause only the set of even-numbered pressers to move forward into contact with the periphery of the mat to compress the mat; and a controller for causing the second drive means to operate after the first drive means is caused to operate.

7. A mat compressing apparatus according to claim 6; wherein the set of odd-numbered pressers comprises a first presser for pressing end portions of the mat.

8. A mat compressing apparatus according to claim 6; wherein each presser in the set of even-numbered pressers has two ends parallel to a movement direction of the presser.

9. An apparatus according to claim 6; further comprising a plurality of rollers disposed at respective base end parts of the plurality of rods; wherein the first and second drive mechanisms comprise respective first and second ring plates for meshing engagement with respective ones of the rollers.

10. An apparatus according to claim 6; wherein the first drive means comprises a first ring plate configured for meshing engagement with base end parts of the rods corresponding to the odd-numbered pressers, and a first actuator connected to the first ring plate; and wherein the second drive means comprises a second ring plate configured for meshing engagement with base end parts of the rods corresponding to the even-numbered pressers, and a second actuator connected to the second ring plate.

11. An apparatus according to claim 10; wherein the first and second ring plates are overlaid over the base and over one another.

12. An apparatus for compressing a mat against a cylindrical catalyst to provide an exhaust gas cleaning device having the catalyst and the mat wrapped around the catalyst, the apparatus comprising:
   a base;
   a plurality of rods movably mounted to the base;
   first and second set of pressers integrally connected to respective ones of the plurality of rods and configured to be disposed around an external periphery of the mat having first and second peripheral surface portions;
   first drive means for moving the rods corresponding to the first set of pressers, but not the rods corresponding to the second set of pressers, to bring the first set of pressers into pressure contact with the first peripheral surface portions of the mat so that the first peripheral surface portions are compressed and the second peripheral surface portions of the mat are formed into respective convex portions; and
   second drive means for moving the rods corresponding to the second set of pressers to bring the second set of pressers into pressure contact with the convex portions of the mat to compress the convex portions while the first set of pressers are maintained in pressure contact with the first peripheral surface portions of the mat.

13. An apparatus according to claim 12; further comprising a plurality of rollers disposed at respective base end parts of the plurality of rods; wherein the first and second drive mechanisms comprise respective first and second ring plates for meshing engagement with respective ones of the rollers.

14. An apparatus according to claim 12; wherein the first set of pressers comprises a first presser for pressing end portions of the mat.

15. An apparatus according to claim 12; wherein each presser of the second set of pressers has two ends parallel to a movement direction of the presser.

16. An apparatus according to claim 12; further comprising a controller configured to control operation of each of the first and second drive mechanisms and to control operation of the second drive mechanism after controlling operation of the first drive mechanism.

17. An apparatus according to claim 16; further comprising a plurality of rollers disposed at respective base end parts of the plurality of rods; wherein the first and second drive mechanisms comprise respective first and second ring plates for meshing engagement with respective ones of the rollers.

18. An apparatus according to claim 12; wherein the first drive means comprises a first ring plate configured for meshing engagement with base end parts of the rods corresponding to the first set of pressers, and a first actuator connected to the first ring plate; and wherein the second drive means comprises a second ring plate configured for meshing engagement with base end parts of the rods corresponding to the second set of pressers, and a second actuator connected to the second ring plate.

19. An apparatus according to claim 18; wherein the first and second ring plates are overlaid over the base and over one another.

* * * * *